US006968784B2

(12) United States Patent
Kiyohara

(10) Patent No.: US 6,968,784 B2
(45) Date of Patent: Nov. 29, 2005

(54) PRINTED TONE CONTROL APPARATUS, AND METHOD OF DETERMINING REPRESENTATIVE POINTS ON PRINTS FOR CONTROLLING TONE

(75) Inventor: Satoru Kiyohara, Kyoto (JP)

(73) Assignee: Dainippon Screen Mfg., Ltd., Kyoto (JP)

( * ) Notice: Subject to any disclaimer, the term of this patent is extended or adjusted under 35 U.S.C. 154(b) by 92 days.

(21) Appl. No.: 10/827,382

(22) Filed: Apr. 20, 2004

(65) Prior Publication Data

US 2004/0237823 A1 Dec. 2, 2004

(30) Foreign Application Priority Data

May 30, 2003 (JP) ...................................... 2003-153662

(51) Int. Cl.[7] ............................ B41F 1/54; G06F 15/00

(52) U.S. Cl. ...................................... 101/484; 358/1.15

(58) Field of Search ................................ 101/484, 365; 382/112, 162; 358/1.15, 1.13

(56) References Cited

U.S. PATENT DOCUMENTS

| | | | | | |
|---|---|---|---|---|---|
| 3,972,066 | A | * | 7/1976 | Seki et al. | 358/527 |
| 4,992,864 | A | * | 2/1991 | Akiyama | 358/523 |
| 5,130,935 | A | * | 7/1992 | Takiguchi | 382/167 |
| 5,335,097 | A | * | 8/1994 | Murakami | 358/520 |
| 5,724,437 | A | | 3/1998 | Bucher et al. | 382/112 |
| 6,006,013 | A | | 12/1999 | Rumph et al. | 358/1.15 |
| 6,137,903 | A | | 10/2000 | Dichter | 382/162 |
| 6,382,101 | B1 | | 5/2002 | Richards | 101/365 |
| 6,710,892 | B2 | * | 3/2004 | Narushima | 358/1.13 |
| 6,715,127 | B1 | | 3/2004 | Eschbach et al. | 715/502 |
| 2001/0038388 | A1 | | 11/2001 | Shiraishi | |

FOREIGN PATENT DOCUMENTS

| | | |
|---|---|---|
| EP | 0-322-879 A2 | 7/1989 |
| EP | 0-566-914 A1 | 10/1993 |
| JP | 4-303660 | 10/1992 |
| JP | 8-261829 | 10/1996 |
| JP | 9-193361 | 7/1997 |
| JP | 10-305562 | 11/1998 |
| JP | 11-240137 | 9/1999 |
| JP | 11-320838 | 11/1999 |
| JP | 2000-99699 | 4/2000 |
| JP | 2000-187735 | 7/2000 |
| JP | 2001-293840 | 10/2001 |
| JP | 2001-353852 | 12/2001 |

* cited by examiner

*Primary Examiner*—Daniel J. Colilla
*Assistant Examiner*—Wasseem H. Hamdan
(74) *Attorney, Agent, or Firm*—McDermott Will & Emery LLP

(57) ABSTRACT

A representative point determining method for determining representative points to be compared when adjusting color tones of a print made by a printing machine, by comparing image data serving as a reference and image data obtained by reading an image on the print. The method includes a representative point setting step executed by an operator for setting a representative point to at least one of a plurality of areas corresponding to ink keys of the printing machine, and a representative point determining step for determining representative points for other areas corresponding to the ink keys based on the representative point set by the operator and by using setting conditions for setting representative points to the other areas.

20 Claims, 9 Drawing Sheets

F I G. 7 A

P 1

| | | | | | |
|---|---|---|---|---|---|
| B | B | A | C | C | A |
| A | B | A | A | A | C |
| E | A | A | B | C | D |
| E | F | B | B | D | D |

K1 K2 K3

F I G. 7 B

| | | | | | |
|---|---|---|---|---|---|
| 1 | 1 | 2 | 1 | 1 | 2 |
| 2 | 1 | 2 | 2 | 2 | 1 |
| 0 | 2 | 2 | 1 | 1 | 0 |
| 0 | 0 | 1 | 1 | 0 | 0 |

K1 K2 K3

PRINTED TONE CONTROL APPARATUS, AND METHOD OF DETERMINING REPRESENTATIVE POINTS ON PRINTS FOR CONTROLLING TONE

BACKGROUND OF THE INVENTION

1. Field of the Invention

This invention relates to a printed tone control apparatus and a method of determining representative points on prints for controlling tone, which are used in controlling ink feeding rates of a printing machine.

2. Description of the Related Art

In order to perform proper printing with a printing machine, it is necessary to control ink feeding rates properly. For controlling the ink feeding rates, it has been conventional practice to measure densities of control strips with a densitometer and determine from density data whether the ink feeding rates are proper or not. However, the density data from the control strips alone is not necessarily sufficient for attaining a proper color tone and the like for a picture area.

For this reason, a print quality measuring apparatus is used which provides control data for controlling the ink feeding rates of a printing machine. The control data is produced by comparing an image on reference paper (OK-sheet) and an image on an actual print.

The reference paper is also called proof paper, and serves as a reference indicating a color tone of finished prints to obtain proper prints. Printing paper actually printed is also called sampling paper which is extracted by the operator from a discharge station of a printing machine at certain intervals during a printing operation. The printing is considered proper when the color tone on the sampling paper substantially coincides with the color tone on the reference paper.

Further, a print quality measuring apparatus has been proposed, as described in Japanese Unexamined Patent Publication 2001-353852, which compares an image on reference paper and an image on an actual print to produce control data for controlling the ink feeding rates of a printing machine.

Where such a print quality measuring apparatus is used, it is difficult to attain an agreement in color tone and the like in all areas between the image on the reference paper and the image on the actual print. For this reason, use is made of representative points having colors that characterize a picture on the print. These representative points are used in order to perform a color control of the image, and are set to the image by the operator.

The ink feeding rates of a printing machine are controlled for each area corresponding to an ink key of the printing machine. It is therefore necessary to set a representative point for each area corresponding to an ink key of the printing machine. A large printing machine has a large number of ink keys. Thus, the operator must go through a complex operation to set representative points for the numerous areas corresponding to the ink keys.

SUMMARY OF THE INVENTION

The object of this invention, therefore, is to provide a tone control apparatus and a representative point determining method for automatically setting representative points, thereby to lighten a representative point setting operation performed by the operator.

The above object is fulfilled, according to this invention, by a tone control apparatus for adjusting color tones of a print made by a printing machine, by comparing image data serving as a reference and image data obtained by reading an image on the print, the apparatus comprising a set representative point storage device for storing a representative point set by an operator to at least one of a plurality of areas corresponding to ink keys of the printing machine, a setting condition storage device for storing setting conditions for setting representative points to other areas corresponding to the ink keys based on the representative point set by the operator, and a representative point determining device for determining representative points for the other areas corresponding to the ink keys based on the representative point stored in the set representative point storage device and the setting conditions stored in the setting condition storage device.

This tone control apparatus can automatically set other representative points, based on the setting conditions, from a representative point set by the operator. This is effective to lighten a representative point setting operation performed by the operator.

In a preferred embodiment of the invention, the image data serving as a reference is image data obtained by reading an image on reference paper.

In another aspect of the invention, a representative point determining method is provided for determining representative points to be compared when adjusting color tones of a print made by a printing machine, by comparing image data serving as a reference and image data obtained by reading an image on the print. This method comprises a representative point setting step executed by an operator for setting a representative point to at least one of a plurality of areas corresponding to ink keys of the printing machine, and a representative point determining step for determining representative points for other areas corresponding to the ink keys based on the representative point set by the operator and by using setting conditions for setting representative points to the other areas.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 7A and 7B are explanatory views schematically showing image areas;

DESCRIPTION OF THE PREFERRED EMBODIMENTS

Figure 1:
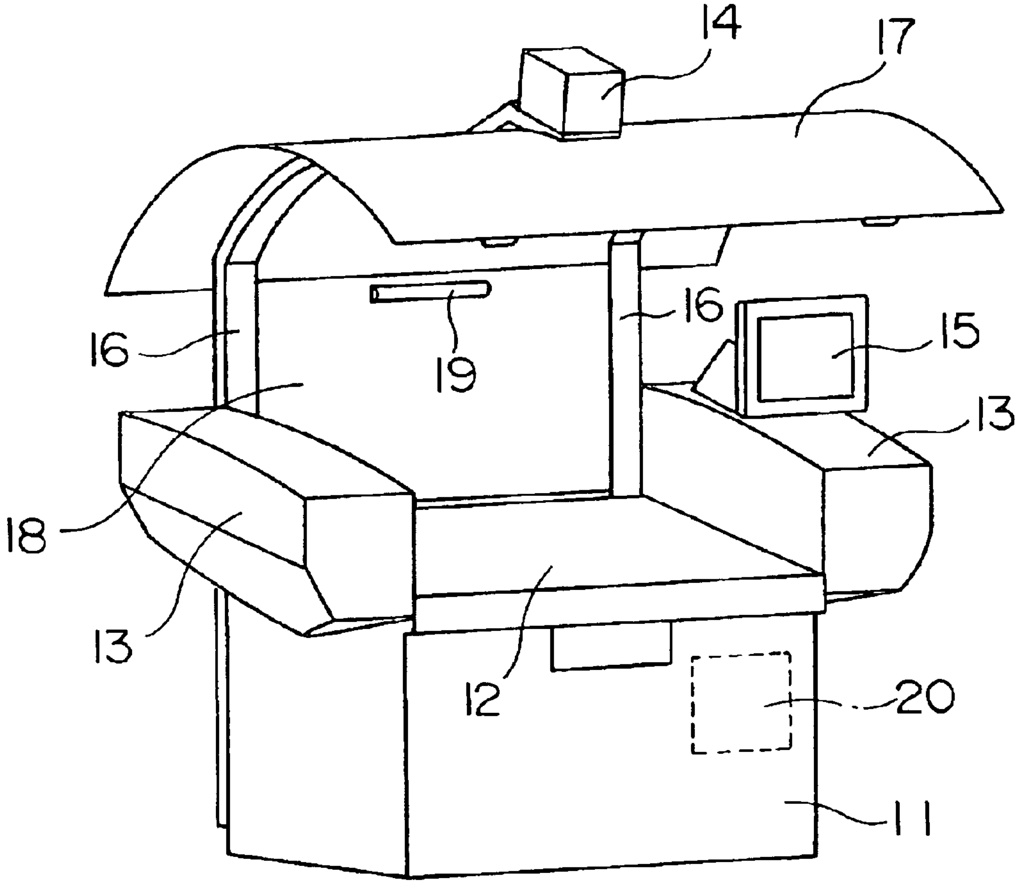
FIG. 1 is a perspective view of a tone control apparatus according to this invention.
Figure 2:
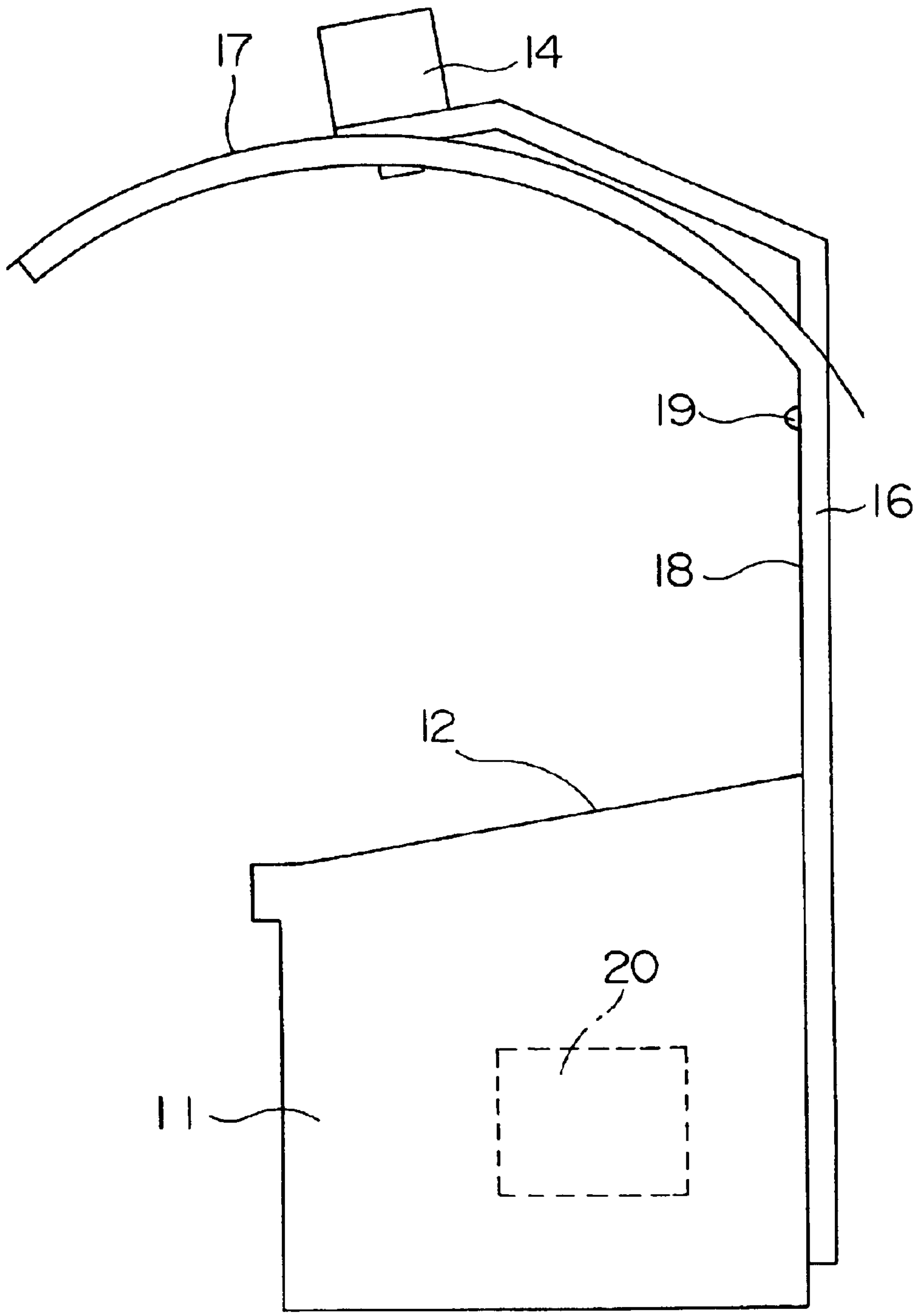
FIG. 2 is a side view of the tone control apparatus.

An embodiment of this invention will be described hereinafter with reference to the drawings. FIG. 1 is a perspective view of a tone control apparatus according to the invention. FIG. 2 is a side view of the apparatus. It is to be noted that light sources 13 and a control panel 15 are omitted from FIG. 2.

This tone control apparatus is used to create control data for controlling ink feeding rates of a printing machine by measuring image qualities of reference paper and actual prints. The tone control apparatus includes a table 12 disposed above a frame 11, a pair of light sources 13 arranged at right and left sides of the table 12, an image pickup unit 14 disposed above the table 12, a control panel 15 disposed above one of the light sources 13, an upper light-shielding plate 17 and a rear light-shielding plate 18 supported by a pair of posts 16, an auxiliary light source 19 attached to the rear light-shielding plate 18, and a control unit 20 mounted inside the frame 11 for controlling the entire apparatus.

The table 12 is shaped planar for receiving a print thereon. The table 12 has a surface in the form of a suction plate for holding the print by static electricity or vacuum suction. The surface of the table 12 is inclined about 10 degrees for facility of operation by the operator. The print held by suction on the inclined surface of the table 12 is illuminated by the pair of light sources 13 arranged at the opposite sides.

The image pickup unit 14 disposed above the table 12 has a digital camera for separating, with a dichroic mirror, light emitted from the light sources 13 and reflected from the surface of the print into the three primary color components of RGB, and receiving the individual components with separate CCD arrays. With this image pickup unit 14, RGB data can be obtained from the print.

The control panel 15 is the touch panel type in the form of an LCD monitor having a pressure sensitive input function (also called a touch sensitive screen). This control panel 15 acts as both a display device and an input device, and is connected to the control unit 20 described hereinafter.

Figure 3:
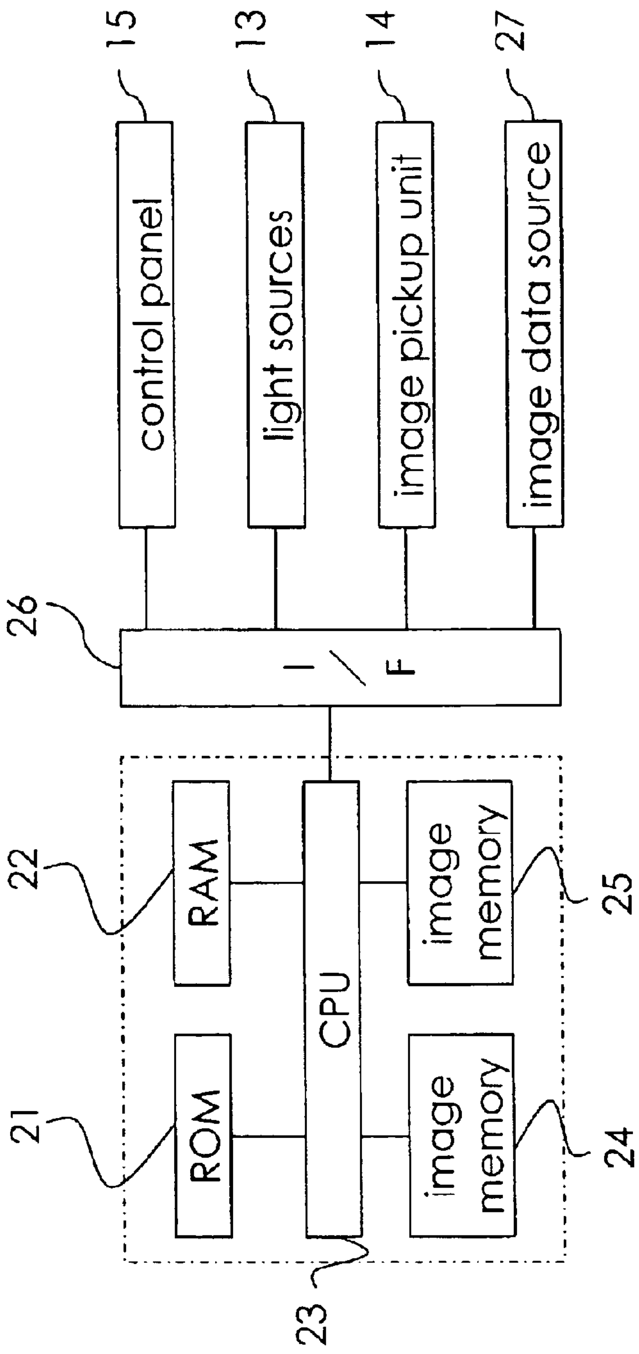
FIG. 3 is a block diagram showing a principal structure of a control unit.

FIG. 3 is a block diagram showing a principal structure of the control unit 20.

This control unit 20 includes a ROM 21 for storing operating programs necessary for controlling the apparatus, a RAM 22 for temporarily storing data and the like during a control operation, a CPU 23 for performing logic operations, and a first and a second image memories 24 and 25. The control unit 20 is connected through an interface 26 to the control panel 15, light sources 13 and image pickup unit 14 noted above. The control unit 20 is connected also to an image data source 27 storing image data to be printed, such as a hard disk or an image processing device. This control unit 20 acts as the representative color determining device of this invention. The RAM 22 acts as the set representative color storage device and setting condition storage device of this invention.

Referring again to FIGS. 1 and 2, the upper light-shielding plate 17 supported by the pair of posts 16 has a curved configuration extending in the fore and aft direction of the tone control apparatus. The light-shielding plate 17 is installed in order to intercept light, such as light from indoor light sources, that would constitute a regular reflection from the table 12. On the other hand, the rear light-shielding plate 18 supported between the pair of posts 16 serves to intercept light coming from behind the tone control apparatus.

The auxiliary light source 19 attached to the rear light-shielding plate 18 serves to compensate for a lack of light on the table 12 caused by the upper light-shielding plate 17 and rear light-shielding plate 18. The auxiliary light source 19 is in the form of a fluorescent light or the like, which is turned off when photographing a print with the image pickup unit 14.

In the tone control apparatus having the above construction, a representative color determining and other steps described in detail hereinafter are first executed by using image data stored in the image data source 27 of an image to be printed.

Next, reading steps are executed to read an image of reference paper and an image actually printed. Specifically, reference paper is first placed on the table 12 and held thereon by suction. The reference paper is illuminated by the light sources 13, and the image of the reference paper is read by the image pickup unit 14. Data of the image of the reference paper is stored in the first image memory 24 of the control unit 20.

Next, a print extracted by the operator from a discharge station of a printing machine during a printing operation is placed on the table 12, and held thereon by suction. This print is illuminated by the light sources 13, and the image of the print is read by the image pickup unit 14. Data of the image of the print is stored in the second image memory 25 of the control unit 20.

Subsequently, the image data of the reference paper stored in the first image memory 24 and the image data of the print stored in the second image memory 25 are compared. At this time, use is made of data of representative points determined in the representative point determining process according to this invention for the respective areas corresponding to the ink keys. Control data is created based on comparison data of the representative points for controlling the ink feeding rates of the printing machine. This control data is transmitted on-line or off-line through the interface 26 to the printing machine not shown.

In the printing machine having received the control data, the ink feeding rates are controlled for the respective areas corresponding to the ink keys. For this purpose, the representative points are set to the respective areas corresponding to the ink keys of the printing machine.

Figure 4:
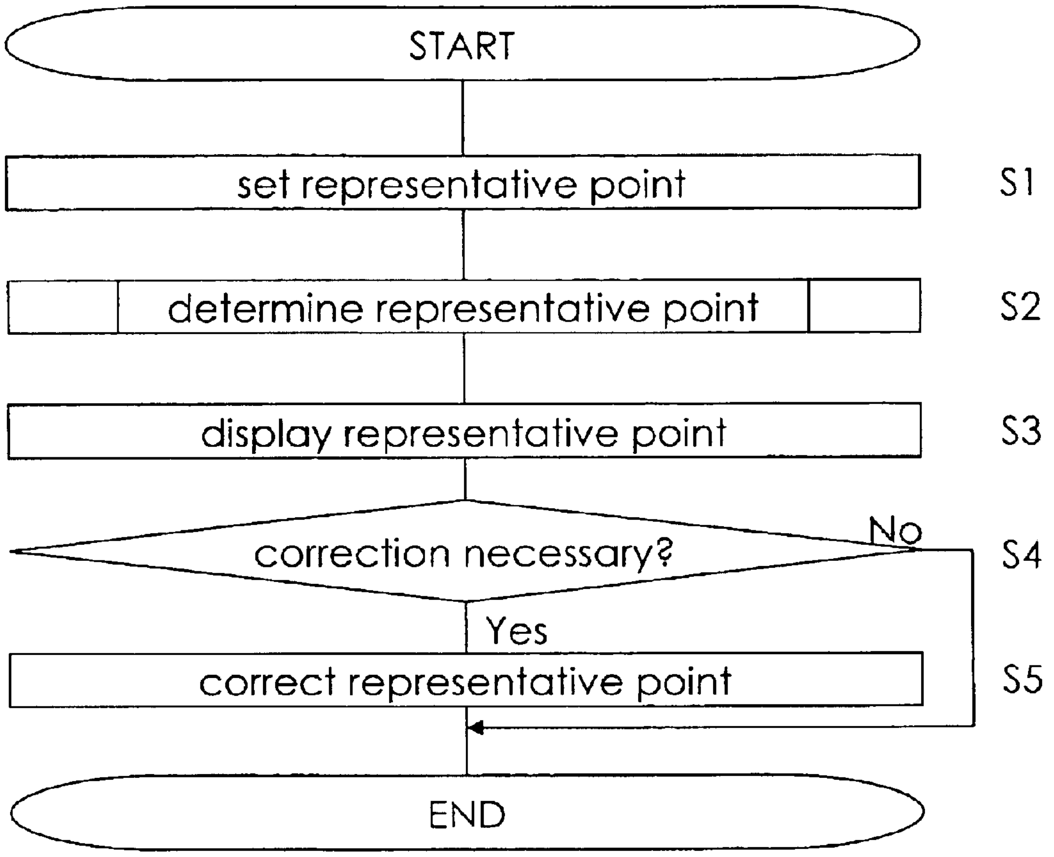
FIG. 4 is a flow chart of a representative point determining method.

The representative point determining method according to this invention will be described hereinafter. FIG. 4 is a flow chart showing the representative point determining method according to this invention.

When automatically determining representative points by the representative point determining method according to this invention, the operator first sets a representative point P1 to at least one area among a plurality of areas corresponding to the ink keys of the printing machine (step S1). Information on the representative point P1 set by the operator is stored in the RAM 22 of the control unit 20 shown in FIG. 3.

Next, based on conditions set beforehand, representative points P2 are automatically determined for areas other than the area corresponding to the ink key for which the representative point P1 has been designated (step S2). That is, the RAM 22 of the control unit 20 has, stored therein beforehand, conditions for setting representative points P2 to areas corresponding to the other ink keys, based on the representative point P1 set by the operator. Based on the representative point P1 designated by the operator and the setting conditions stored in the RAM 22, the control unit 20 automatically determines representative points P2 for a plurality of areas other than the area corresponding to the ink key designated the representative point P1.

The representative point determining step (step S2) for automatically determining the representative points P2 will be describes in detail hereinafter.

Next, the plurality of representative points P2 determined automatically are displayed on the control panel 15 along with the representative point P1 set by the operator (step S3).

Figure 5A:
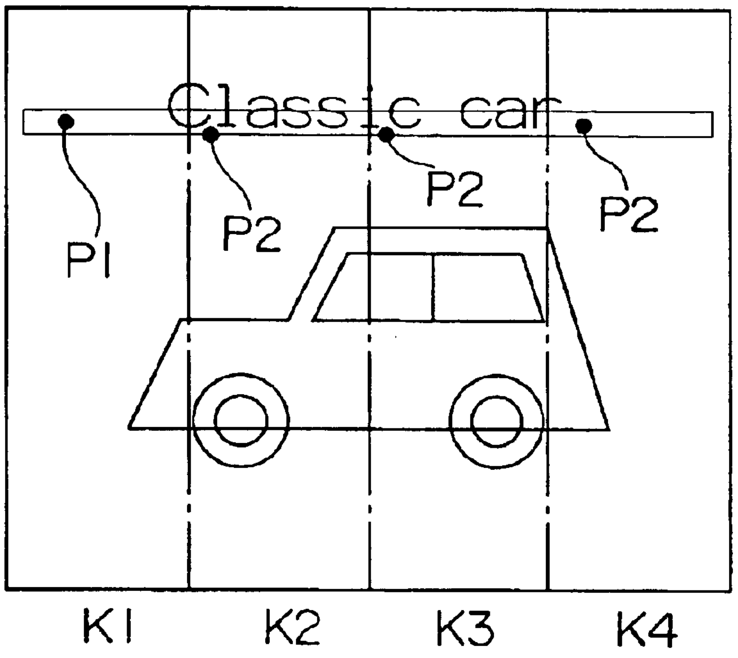
FIGS. 5A and 5B are explanatory views schematically showing images displayed on a control panel in time of determining representative points.

FIG. 5A is an explanatory view schematically showing an image displayed on the control panel 15 in time of determining the representative points.

Figure 5B:
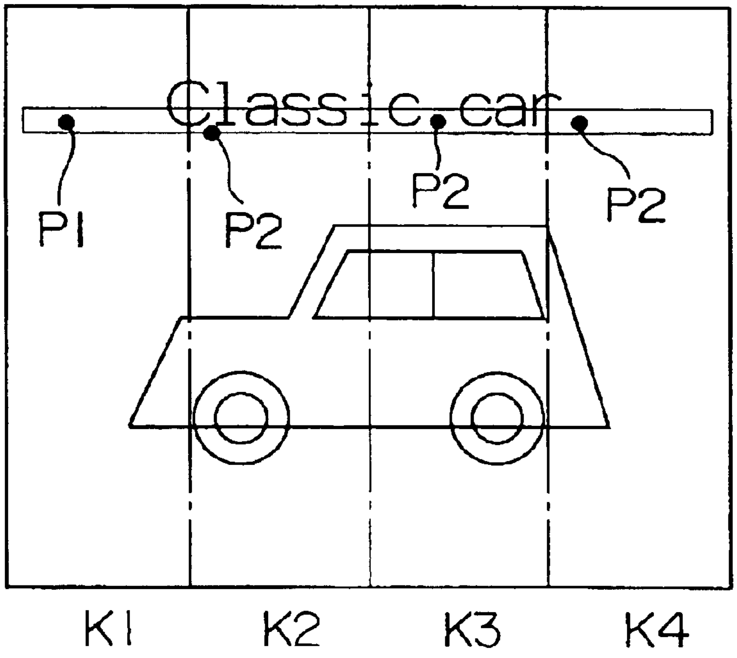

For expediency of description, FIGS. 5A and 5B show a case where four areas K1, K2, K3 and K4 corresponding to the ink keys are set to the image. As shown in these figures, the area K1 includes the representative point P1 set by the operator. The other areas K2, K3 and K4 include the representative points P2 automatically determined by the control unit 20.

Next, the operator checks the image displayed on the control panel 15, and determines whether it is necessary to correct the representative points P2 determined automatically (step S4).

When a correction is required, the operator uses the control panel 15 of the touch panel type, and corrects the position of any representative point P2 that should be corrected (step S5). FIG. 5B shows a state where the position of the representative point P2 in the area K3 has been corrected. When no correction is required, the process is simply ended.

Figure 6:
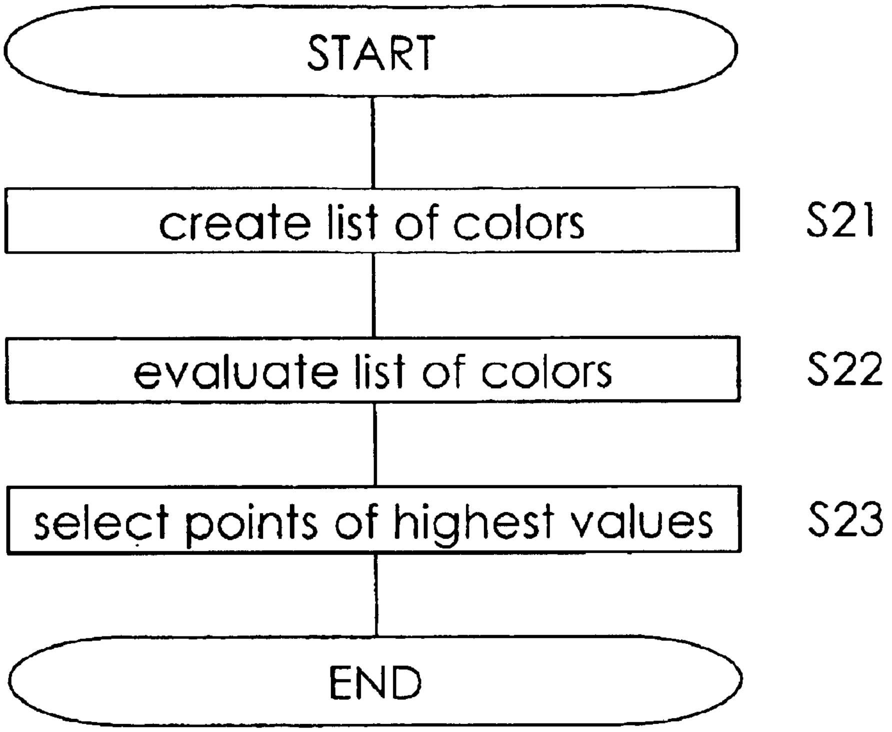
FIG. 6 is a flow chart of a representative point determining process.

Next, the representative point determining step (step S2) will be described. FIG. 6 is a flow chart showing the representative point determining step. FIGS. 7 and 8 are explanatory views schematically showing image areas. For simplicity of description, FIGS. 7 and 8 show three image areas K1, K2 and K3 corresponding to the ink keys of the printing machine, each of the image areas K1, K2 and K3 consisting of only eight points arranged in four rows and two columns.

First, a list of colors is created by using the image data, stored in the image data source 27, of an image to be printed (step S21). For the list of colors, values in a color space such as of Lab or a density space such as of RGB or YMCK, for example, are used.

FIG. 7A shows the list of colors created in this step. For simplicity of description, the image is assumed to be consisting of only six colors A–F. It is assumed that, in the representative point setting step (step S1) shown in FIG. 4, the operator has selected a point in the first column and third row in the area K2 as the representative point P1.

Next, the list of colors is evaluated (step S22). The list of colors is evaluated based on the following three conditions stored in the RAM 22 for setting representative points in the areas corresponding to the other ink keys based on the representative point set by the operator.

First, an evaluation is carried out based on areas of the same color. That is, a color having a large area on a printed image is regarded as relatively important and is given a high value. Specifically, as shown in FIG. 7B, value 2 is given to color A having the largest area on the printed image, and value 1 is give to color B and color C color having the next largest areas. A high value may be given to points having an important color, regardless of its area size.

The same color herein means a group of colors within a predetermined range of color differences or density differences.

Figure 8A:
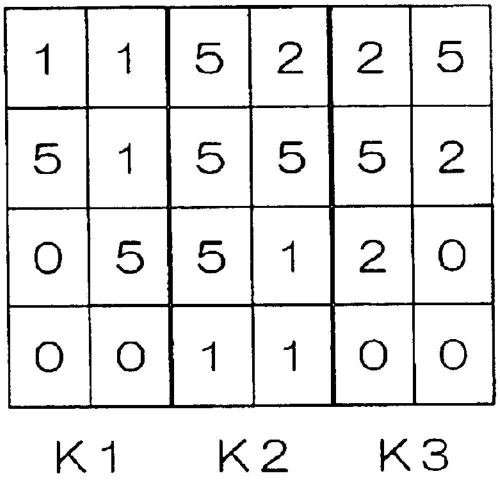
FIGS. 8A and 8B are explanatory views schematically showing image areas.

Next, a high value is given to a color close to the color of the representative point P1 set by the operator. Where, for example, color C in the image shown in FIG. 7A is close to color A of the representative point P1 set by the operator, as shown in FIG. 8A, value +3 is given to color A, and value+1 to color C.

Whether a color is close or not is determined from whether that color is in the predetermined range of color differences or density differences.

Figure 8B:
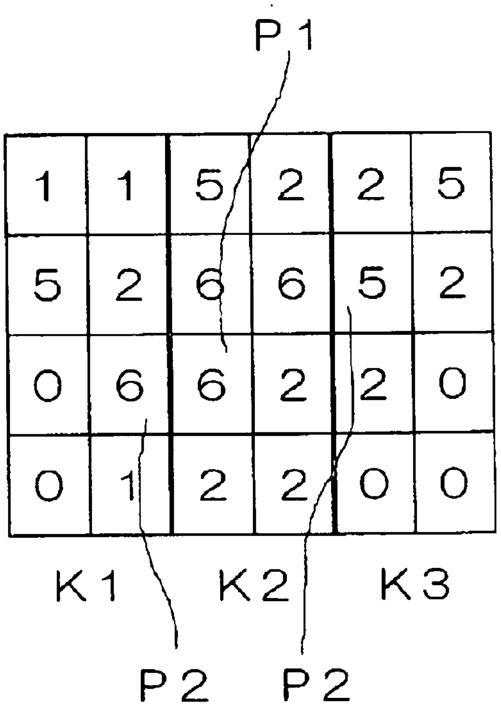

Next, a high value is given to points near the representative point P1 set by the operator. Specifically, as shown in FIG. 8B, value+1 is given to each point adjoining the representative point P1 set by the operator. The values may be varied according to distances to the representative point P1 set by the operator.

After completing the above steps, the points having the highest values are determined to be representative points P2 for the areas K1 and K3 corresponding to the ink keys of the printing machine. Specifically, as shown in FIG. 8B, the representative point P2 in the area K1 is in the second column and third row, and the representative point P2 in the area K3 is in the first column and second row. For the area K2, the representative point P1 set by the operator is used.

As described above, the representative point setting method according to this invention can automatically set other representative points based on a representative point set by the operator. This is effective to lighten a representative point setting operation performed by the operator.

In the above example, the determination is made based on the three setting conditions. The determination may be made based on one or two of these three setting conditions, or a different setting condition or conditions may be added.

After determining the representative points P1 and P2, an additional function may be carried out to bring the colors of these representative points P1 and P2 into agreement. That is, when the reference paper is poor in surface uniformity, different positions may present different tones even though they have the same YMCK values. Such an inconvenience may be overcome by causing the color information on a certain representative point to be reflected in the color information on other representative points.

Specifically, a copy button and a paste button may be provided on the control panel 15, and the color information on a certain representative point may be stored in memory after selecting the representative point by pressing the copy button. After selecting a next representative point, the paste button is pressed to reflect the color information on the first representative point in the color information on the succeeding representative point. In this way, the above problem may be solved.

Figure 9:
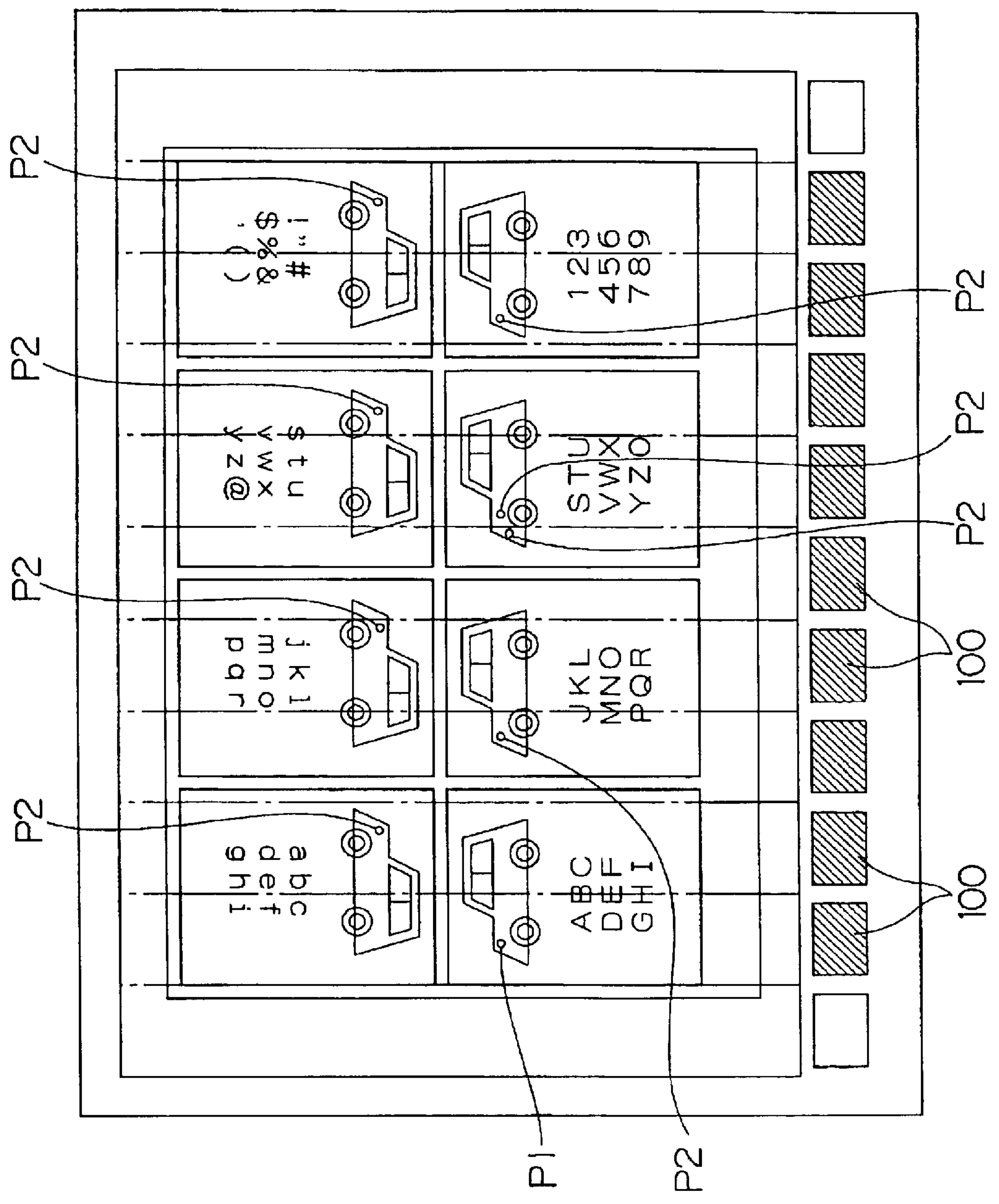
FIG. 9 is an explanatory view schematically showing image areas.

In the foregoing embodiment, a list of colors is evaluated by using area sizes of the colors, similarity of the colors, and distances to a representative point. However, in the case of paged prints, for example, a high value may be given to similar positions in an image including directions based on page information. That is, where, as shown in FIG. 9, an image has picture areas and character areas arranged regularly, a high value may be given to areas having conditions similar to a representative point P1 set by the operator, so that representative points P2 are determined from similar areas.

When a representative point is changed or moved as shown in FIG. 5B, the new representative point may be treated in the same way as the representative point set by the operator, to perform the automatic setting again.

Information on a plurality of representative points set as above may be added together.

Further, when an image to be printed is altered in the case of related prints such as paged prints, the tones of representative points may be brought into agreement by causing the information on a first representative point to be reflected in subsequent representative points.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2003-153662 filed in the Japanese Patent Office on May 30, 2003, the entire disclosure of which is incorporated herein by reference.

What is claimed is:

1. A tone control apparatus for adjusting color tones of a print made by a printing machine, by comparing image data serving as a reference and image data obtained by reading an image on the print, said apparatus comprising:

set representative point storage means for storing a representative point set by an operator to at least one of a plurality of areas corresponding to ink keys of said printing machine;

setting condition storage means for storing setting conditions for setting representative points to other areas corresponding to the ink keys based on the representative point set by said operator; and representative point determining means for determining representative points for the other areas corresponding to the ink keys based on the representative point stored in said set representative point storage means and the setting conditions stored in said setting condition storage means.

2. A tone control apparatus as defined in claim 1, wherein said image data serving as a reference is image data obtained by reading an image on reference paper.

3. A tone control apparatus as defined in claim 1, further comprising means for bringing into agreement a color of the representative point stored in said representative point storage means and colors of the representative points determined by said representative point determining means.

4. A tone control apparatus as defined in claim 1, further comprising representative point correcting means operable by the operator for correcting a representative point determined by said representative point determining means, said set representative point storage means storing the representative point corrected by said representative point correcting means.

5. A tone control apparatus as defined in claim 1, wherein said representative point determining means is arranged to create a list of colors in the areas corresponding to the ink keys, evaluate the list of colors, and determine points of highest value to be the representative points.

6. A tone control apparatus as defined in claim 5, wherein said representative point determining means is arranged to give a high value to a color having a large area size.

7. A tone control apparatus as defined in claim 5, wherein said representative point determining means is arranged to give a high value to a color similar to a color of the representative point set by the operator.

8. A tone control apparatus as defined in claim 5, wherein said representative point determining means is arranged to give a high value to a point at a short distance to the representative point set by the operator.

9. A tone control apparatus as defined in claim 5, wherein said representative point determining means is arranged to give a high value to similar positions in an image including directions based on page information when making paged prints.

10. A tone control apparatus as defined in claim 1, further comprising means for copying color information on one of the representative point stored in the set representative point storage means and the representative points determined by the representative point determining means, in order to reflect the copied color information on color information of another representative point.

11. A representative point determining method for determining representative points to be compared when adjusting color tones of a print made by a printing machine, by comparing image data serving as a reference and image data obtained by reading an image on the print, comprising:

a representative point setting step executed by an operator for setting a representative point to at least one of a plurality of areas corresponding to ink keys of the printing machine; and a representative point determining step for determining representative points for other areas corresponding to the ink keys based on the representative point set by said operator and by using setting conditions for setting representative points to said other areas.

12. A representative point determining method as defined in claim 11, wherein said image data serving as a reference is image data obtained by reading an image on reference paper.

13. A representative point determining method as defined in claim 11, further comprising a step of bringing into agreement a color of the representative point set by the operator and colors of the representative points determined in the representative point determining step.

14. A representative point determining method as defined in claim 11, wherein said representative point determining step includes a representative point correcting step for correcting a representative point determined.

15. A representative point determining method as defined in claim 14, wherein said representative point correcting step is executed manually by the operator.

16. A representative point determining method as defined in claim 15, further comprising a second representative point storing step for storing the representative point corrected in said representative point correcting step.

17. A representative point determining method as defined in claim 11, wherein said representative point determining step includes:

a step of creating a list of colors in the areas corresponding to the ink keys;

a step of evaluating the list of colors; and a step of determining points of highest value to be the representative points.

18. A representative point determining method as defined in claim 17, wherein said representative point determining step is executed to give a high value to a color having a large area size.

19. A representative point determining method as defined in claim 17, wherein said representative point determining step is executed to give a high value to a color similar to a color of the representative point set by the operator.

20. A representative point determining method as defined in claim 17, wherein said representative point determining step is executed to give a high value to a point at a short distance to the representative point set by the operator.

* * * * *